United States Patent
Krinke (10) Patent No.: US 10,489,066 B1
(45) Date of Patent: Nov. 26, 2019

(54) SYSTEMS AND METHODS FOR ENSURING RIGHT-TO-ERASURE COMPLIANCE DURING DATA RECOVERY

(71) Applicant: Veritas Technologies LLC, Mountain View, CA (US)

(72) Inventor: Thomas Krinke, Forest Lake, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 52 days.

(21) Appl. No.: 15/441,216

(22) Filed: Feb. 23, 2017

(51) Int. Cl.
*G06F 3/06* (2006.01)
*G06F 11/14* (2006.01)

(52) U.S. Cl.
CPC ............ *G06F 3/0619* (2013.01); *G06F 3/065* (2013.01); *G06F 3/067* (2013.01); *G06F 11/1451* (2013.01); *G06F 11/1458* (2013.01); *G06F 2201/84* (2013.01)

(58) Field of Classification Search
CPC ........ G06F 3/0619; G06F 3/065; G06F 3/067; G06F 11/1451; G06F 11/1458; G06F 2201/84
See application file for complete search history.

(56) References Cited

U.S. PATENT DOCUMENTS

2009/0193215 A1* 7/2009 Rogers ................ G06F 13/4063
711/166
2014/0059355 A1* 2/2014 Schuette ............. G06F 21/6218
713/189
2017/0286717 A1* 10/2017 Khi ......................... H04L 61/15
(Continued)

OTHER PUBLICATIONS

Vijfvinkel, "Technology and the Right to be Forgotten," Master's Thesis, Computing Science, Radboud University, Nijmegen, NL, Jul. 2016, 68 pages.*

(Continued)

*Primary Examiner* — Glenn Gossage
(74) *Attorney, Agent, or Firm* — FisherBroyles, LLP (57) ABSTRACT

A computer-implemented method and a system for ensuring right-to-erasure compliance during data recovery are disclosed. The method may include intercepting a request to perform a recovery process to restore backup data, automatically comparing a backup image of requested data with a record of right-to-erasure orders, and determining, based on the comparison, that the backup image includes individual data related to at least one right-to-erasure order. The record of right-to-erasure orders may include at least one of an identity of an individual, at least one creation and/or execution date of a right-to-erasure order, and/or a list of backup images associated with a right-to-erasure order. The method may further include erasing the individual data to comply with the at least one right-to-erasure order, recording the erasure of the individual data in an audit log, and completing the recovery process for the requested data. Erasing the individual data to comply with the at least one right-to-erasure order may include deleting the individual data from a backup image, deleting a backup image, isolating a backup image in a quarantine environment, and/or notifying an administrator, which may be a user with special privilege to access right-to-erasure data.

20 Claims, 5 Drawing Sheets

(56) References Cited

U.S. PATENT DOCUMENTS

2018/0307859 A1\* 10/2018 LaFever ............. G06F 21/6254
2018/0341784 A1\* 11/2018 Barday ............... G06F 21/6245

OTHER PUBLICATIONS

Gottlieb, Carl (The GPDR Guy), "Right to Erasure," dated Feb. 16, 2017 (downloaded from https://thegdprguy.com/right-to-erasure/ on Jun. 9, 2018), 7 pages.\*

\* cited by examiner

SYSTEMS AND METHODS FOR ENSURING RIGHT-TO-ERASURE COMPLIANCE DURING DATA RECOVERY

BACKGROUND

In some recent legal policies, such as the European Union's proposed General Data Protection Regulation, the idea of "right to erasure" or "right to be forgotten" proposes that data for a particular entity must be deleted from certain records upon request. For example, past criminal records for an individual may be required by law to be erased from Internet search results after a set period of time. However, identifying and completely removing all relevant data from records may be a difficult process. There may be incomplete information regarding what exact data within a particular backup copy is related to the entity. For example, a backup copy that is created before a right-to-erasure order is executed may not contain detailed information on all data that is relevant to the right-to-erasure order. In addition, with certain data storage methods such as a deduplication process, a subset of data within a backup image may not be able to be deleted without deleting the entire backup image. Thus, when a piece of data or an application is restored, relevant data tied to the entity may be unintentionally reintroduced into the system.

Furthermore, legal measures may require proof of data deletion in connection with right-to-erasure orders for an entity. In such cases as the deduplication example, proving the erasure of records for a single entity among multiple entities in a backup image may be difficult or even impossible. The instant disclosure, therefore, identifies and addresses a need for improved systems and methods for ensuring right-to-erasure compliance.

SUMMARY

As will be described in greater detail below, the instant disclosure describes various systems and methods for ensuring right-to-erasure compliance during data recovery. In one example, a computer-implemented method for ensuring right-to-erasure compliance during data recovery may include (i) intercepting, by a computing device, a request to recover data, (ii) automatically comparing, by the computing device, a backup image of the requested data with a record of right-to-erasure orders, (iii) determining, by the computing device and based on the comparison, that the backup image includes individual data related to at least one right-to-erasure order, (iv) erasing, by the computing device, the individual data to comply with the right-to-erasure order, (v) recording, by the computing device, the erasure of the individual data in an audit log, and (vi) completing, by the computing device, a recovery process for the requested data.

In one embodiment, the record of right-to-erasure orders may include an identity of an individual, a creation date of the right-to-erasure order, and/or an execution date of data erasure for the right-to-erasure order. Additionally or alternatively, the record may include a list of backup images associated with the right-to-erasure order.

In some examples, determining that the backup image includes individual data related to the right-to-erasure order may include identifying at least one individual for which the backup image contains information. In these examples, determining that the backup image includes individual data related to the right-to-erasure order may further include determining that the individual is associated with the right-to-erasure order in the record of right-to-erasure orders.

In some embodiments, erasing the individual data to comply with the right-to-erasure order may include identifying the individual data based on metadata of the backup image and/or notifying an administrator of the right-to-erasure order. In these embodiments, the administrator may include a user with special privilege to access right-to-erasure data. Additionally or alternatively, erasing the individual data to comply with the right-to-erasure order may include isolating the backup image in a quarantine environment, deleting the individual data from the backup image, and/or deleting the backup image.

In some examples, the audit log may include a list of actions showing deletion of the individual data. Additionally or alternatively, the audit log may include a list of actions showing deletion of the backup image.

In some embodiments, completing the recovery process for the requested data may include reintroducing the backup image to an unquarantined environment and completing the recovery process using the backup image after erasing the individual data. Additionally or alternatively, completing the recovery process for the requested data may include completing the recovery process using a different backup image that does not include the individual data. In additional embodiments, completing the recovery process for the requested data may include alerting a user about a lack of backup images that comply with the right-to-erasure order.

In one example, the computer-implemented method may further include automatically sending a notification of the completion of the recovery process in compliance with the right-to-erasure order.

In one embodiment, a system for implementing the above-described method for ensuring right-to-erasure compliance during data recovery may include (i) an interception module, stored in memory, that intercepts, by a computing device, a request to recover data, (ii) a comparison module, stored in memory, that automatically compares, by the computing device, a backup image of the requested data with a record of right-to-erasure orders, (iii) a determination module, stored in memory, that determines, by the computing device and based on the comparison, that the backup image includes individual data related to at least one right-to-erasure order, (iv) an erasure module, stored in memory, that erases, by the computing device, the individual data to comply with the right-to-erasure order, (v) a recording module, stored in memory, that records, by the computing device, the erasure of the individual data in an audit log, and (vi) a completion module, stored in memory, that completes, by the computing device, a recovery process for the requested data. In addition, the system includes at least one processor that executes the interception module, the comparison module, the determination module, the erasure module, the recording module, and the completion module.

In some examples, the above-described method may be encoded as computer-readable instructions on a non-transitory computer-readable medium. For example, a non-transitory computer-readable medium may include one or more computer-executable instructions that, when executed by at least one processor of a computing device, cause the computing device to (i) intercept a request to recover data, (ii) automatically compare a backup image of the requested data with a record of right-to-erasure orders, (iii) determine, based on the comparison, that the backup image includes individual data related to at least one right-to-erasure order, (iv) erase the individual data to comply with the right-to-erasure order, (v) record the erasure of the individual data in an audit log, and (vi) complete a recovery process for the requested data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for ensuring right-to-erasure compliance during data recovery. As will be explained in greater detail below, by executing right-to-erasure orders during data recovery rather than data backup, the systems and methods described herein may provide more stringent controls to ensure compliance of orders. For example, by detecting that a backup image includes individual data related to a right-to-erasure order, the disclosed systems and methods may prevent a recovery process from completing data recovery with the individual data intact. Furthermore, by erasing the individual data or a backup image before recovery, the disclosed systems and methods may ensure the recovery process does not violate a right-to-erasure order placed on the data.

In addition, the systems and methods described herein may improve the functioning of a computing device by automatically checking for right-to-erasure compliance to prevent incorrect data recovery. These systems and methods may also improve the fields of data backup and/or data storage by deleting data in connection with right-to-erasure orders during recovery and placing an additional burden of right-to-erasure compliance on the recovery process.

Figure 1:
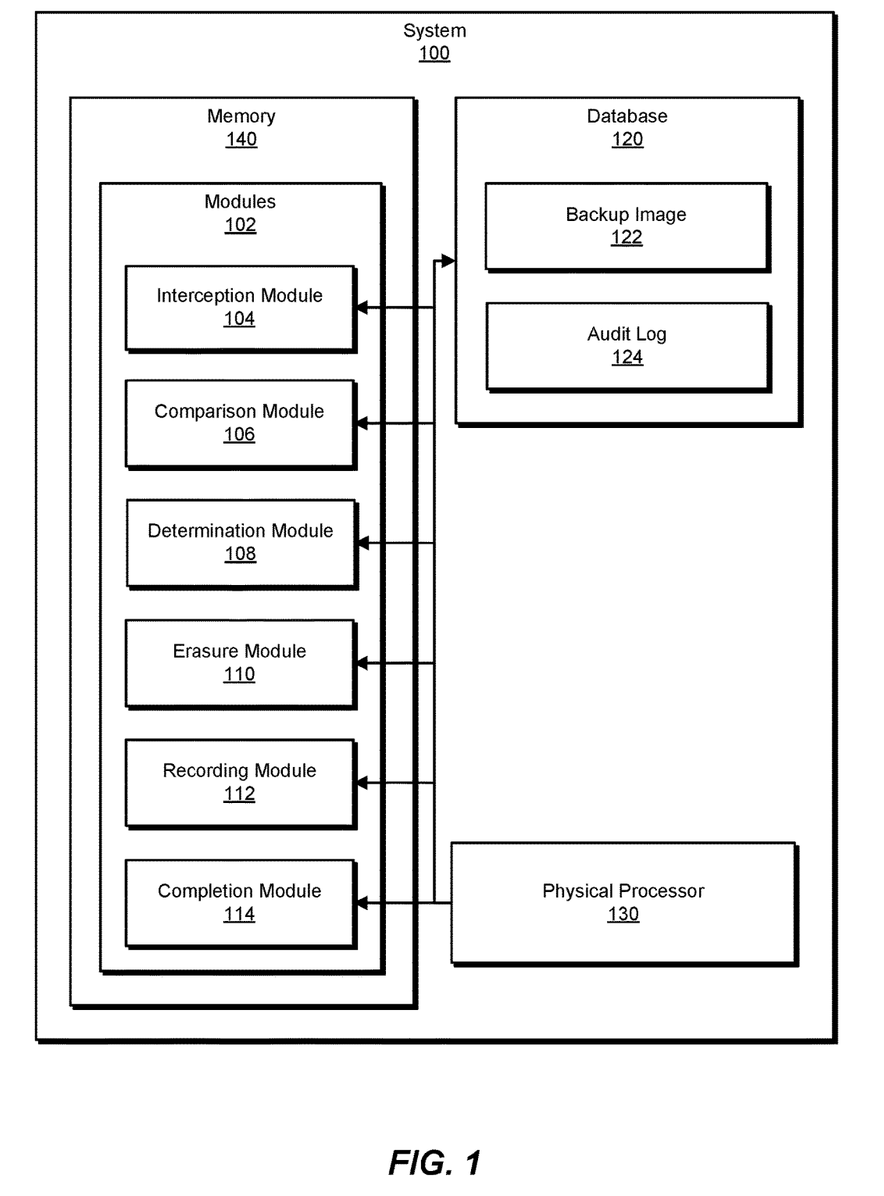
FIG. 1 is a block diagram of an example system for ensuring right-to-erasure compliance during data recovery.
Figure 2:
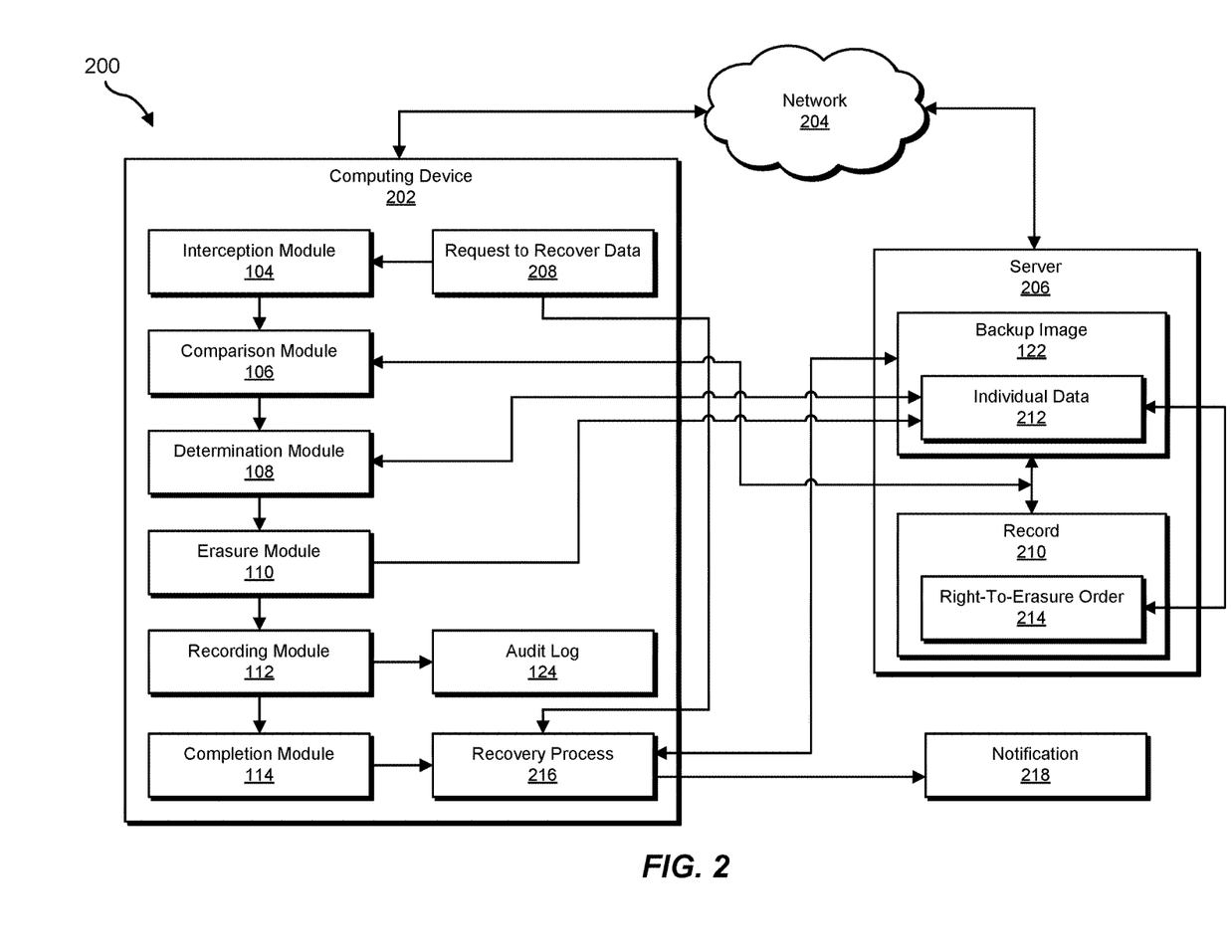
FIG. 2 is a block diagram of an additional example system for ensuring right-to-erasure compliance during data recovery.

The following will provide, with reference to FIGS. 1 and 2, detailed descriptions of example systems for ensuring right-to-erasure compliance during data recovery. Detailed descriptions of corresponding computer-implemented methods will also be provided in connection with FIG. 3. In addition, detailed descriptions of an example comparison of an example backup image and an example record of right-to-erasure orders will be provided in connection with FIG. 4. Furthermore, detailed descriptions of an example data erasure using an example quarantine environment will be provided in connection with FIG. 5.

FIG. 1 is a block diagram of example system 100 for ensuring right-to-erasure compliance during data recovery. As illustrated in this figure, example system 100 may include one or more modules 102 for performing one or more tasks. For example, and as will be explained in greater detail below, modules 102 may include an interception module 104 that intercepts, by a computing device, a request to recover data. Modules 102 may additionally include a comparison module 106 that automatically compares, by the computing device, a backup image of the requested data with a record of right-to-erasure orders. As used herein, the term "backup image" generally refers to a backup copy of a file, a set of files, and/or software on a computing system. Examples of backup images may include, without limitation, a backup file, a snapshot, a system image, a system clone, variations or combinations of one or more of the same, and/or any other suitable backup copy. The term "right-to-erasure order," as used herein, generally refers to a formal directive to erase or delete data pertaining to a specific entity from a system's records.

Modules 102 may also include a determination module 108 that determines, by the computing device and based on the comparison, that the backup image includes individual data related to at least one right-to-erasure order. The term "individual data," as used herein, generally refers to any data that may pertain to a specific individual or entity. Notably, individual data may contain identifying information that connects the data to the individual.

In addition, modules 102 may include an erasure module 110 that erases, by the computing device, the individual data to comply with the right-to-erasure order. Modules 102 may also include a recording module 112 that records, by the computing device, the erasure of the individual data in an audit log. Modules 102 may further include a completion module 114 that completes, by the computing device, a recovery process for the requested data. The term "recovery process," as used herein, generally refers to a sequence of actions performed to recover and/or restore data from a backup copy. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate ensuring right-to-erasure compliance during data recovery. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more databases, such as database 120. In one example, database 120 may be configured to store a backup image 122, which may include a backup copy of a system or files, and/or an audit log 124, which may include a record of actions complying with right-to-erasure orders. Database 120 may represent portions of a single database or computing device or a plurality of databases or computing devices. For example, database 120 may represent a portion of computing device 202 and/or server 206 in FIG. 2. Alternatively, database 120 in FIG. 1 may represent one or more physically separate devices capable of being accessed by a computing device, such as computing device 202 and/or server 206 in FIG. 2.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. Similarly, both server 206 and computing device 202 may be merged into a single machine or computing system such that the functionality of each of modules 102 is provided within a single device.

As will be described in greater detail below, one or more of modules 102 from FIG. 1 may, when executed by at least one processor of computing device 202 and/or server 206, enable computing device 202 and/or server 206 to automatically check for right-to-erasure orders before recovering backup data. For example, and as will be described in greater detail below, interception module 104 may intercept a request 208 to recover data. Comparison module 106 may automatically compare backup image 122 of the requested data with a record 210 of right-to-erasure orders. Determination module 108 may determine, based on the comparison, that backup image 122 includes individual data 212 related to a right-to-erasure order 214. Erasure module 110 may erase individual data 212 to comply with right-to-erasure order 214. Recording module 112 may record the erasure of individual data 212 in audit log 124. Completion module 114 may complete a recovery process 216 for the requested data.

In the example of FIG. 2, and as will be explained in greater detail below, computing device 202 may first receive request 208 to recover certain data. Computing device 202 may then compare backup image 122 of the requested data with record 210 on server 206 via network 204. Next, computing device 202 may determine that individual data 212 on backup image 122 corresponds to right-to-erasure order 214 in record 210. Additionally, computing device 202 may erase individual data 212 from backup image 122 to comply with right-to-erasure order 214. Computing device 202 may also record the erasure in audit log 124. Finally, computing device 202 may complete recovery process 216 for backup image 122 without individual data 212. Computing device 202 may further send a notification 218 regarding the completion of recovery process 216.

Computing device 202 generally represents any type or form of computing device capable of reading computer-executable instructions. For example, computing device 202 may represent an endpoint device running client-side backup software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Server 206 generally represents any type or form of computing device that is capable of storing, transmitting, and/or managing backup data and/or records of right-to-erasure orders. For example, server 206 may represent a backup server that stores backup copies for client machines. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type storage media, such as magnetic-storage media (e.g., hard disk drives, tape drives, and floppy disks), optical-storage media (e.g., Compact Disks (CDs), Digital Versatile Disks (DVDs), and BLU-RAY disks), electronic-storage media (e.g., solid-state drives and flash media), and other distribution systems.

Figure 3:
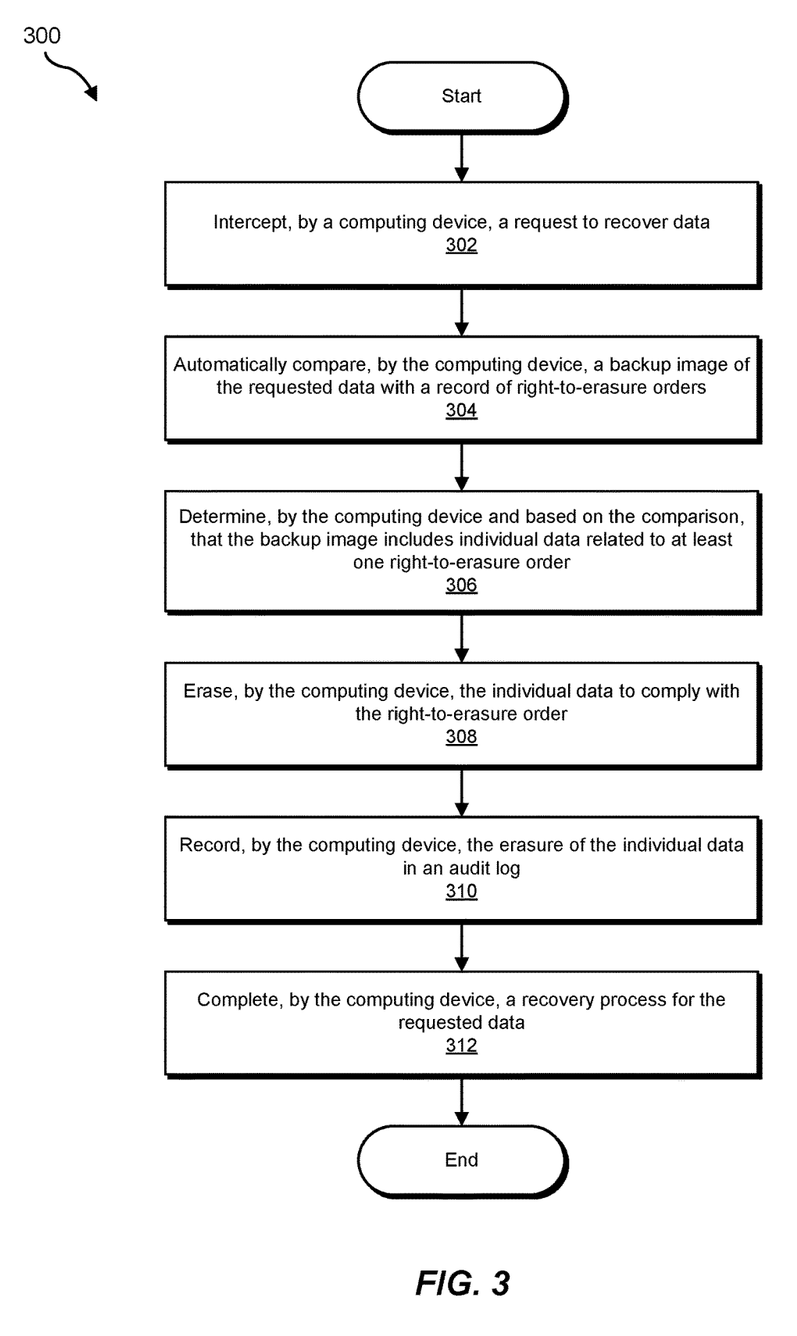
FIG. 3 is a flow diagram of an example method for ensuring right-to-erasure compliance during data recovery.

FIG. 3 is a flow diagram of an example computer-implemented method 300 for ensuring right-to-erasure compliance during data recovery. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may intercept, by a computing device, a request to recover data. For example, interception module 104 may, as part of computing device 202 in FIG. 2, intercept request 208 to recover data.

Interception module 104 may intercept request 208 in a variety of ways. In some examples, interception module 104 may intercept request 208 from a software program attempting to execute a data recovery process, such as recovery process 216. In these examples, interception module 104 may monitor data recovery and/or data backup software for recovery attempts. In other examples, a user or administrator of computing device 202 may send request 208 to recover data. In further examples, interception module 104 may intercept request 208 from another computing device, such as a client device monitored by computing device 202, to recover data from server 206. In these examples, interception module 104 may directly or indirectly monitor recovery attempts on the other computing device and/or may force an interruption in recovery process 216 after intercepting request 208.

Returning to FIG. 3, at step 304, one or more of the systems described herein may automatically compare, by the computing device, a backup image of the requested data with a record of right-to-erasure orders. For example, comparison module 106 may, as part of computing device 202 in FIG. 2, automatically compare backup image 122 of the requested data with record 210 of right-to-erasure orders.

Comparison module 106 may compare backup image 122 and record 210 in a variety of ways. In one embodiment, record 210 of right-to-erasure orders may include an identity of an individual, a creation date of a right-to-erasure order, such as right-to-erasure order 214, an execution date of data erasure for the right-to-erasure order, and/or a list of backup images associated with the right-to-erasure order. In this embodiment, right-to-erasure order 214 may have been previously executed to erase data associated with an individual on existing files but not on backup copies, such as backup image 122. Furthermore, the list of backup images associated with each right-to-erasure order may be included or correspond to metadata for the backup images. The term "metadata," as used herein, generally refers to data that describes or provides additional information about other data or files. For example, metadata for the backup images may include information about files or parts of files that contain data on a specific entity. The metadata may also include information about previous erasures of data associated with right-to-erasure orders during the execution of the right-to-erasure orders and correspond the information with backup images of the erased data.

In alternate embodiments, comparison module 106 may compare record 210 with multiple backup images to determine which, if any, right-to-erasure order applies to each backup image. In these embodiments, comparison module 106 may further select backup images to compare based on the creation dates and/or execution dates of right-to-erasure orders to determine which backup images were created before the right-to-erasure orders, and thus may contain individual data associated with the right-to-erasure orders. Additionally or alternatively, comparison module 106 may select backup images to compare based on metadata for the backup images.

Figure 4:
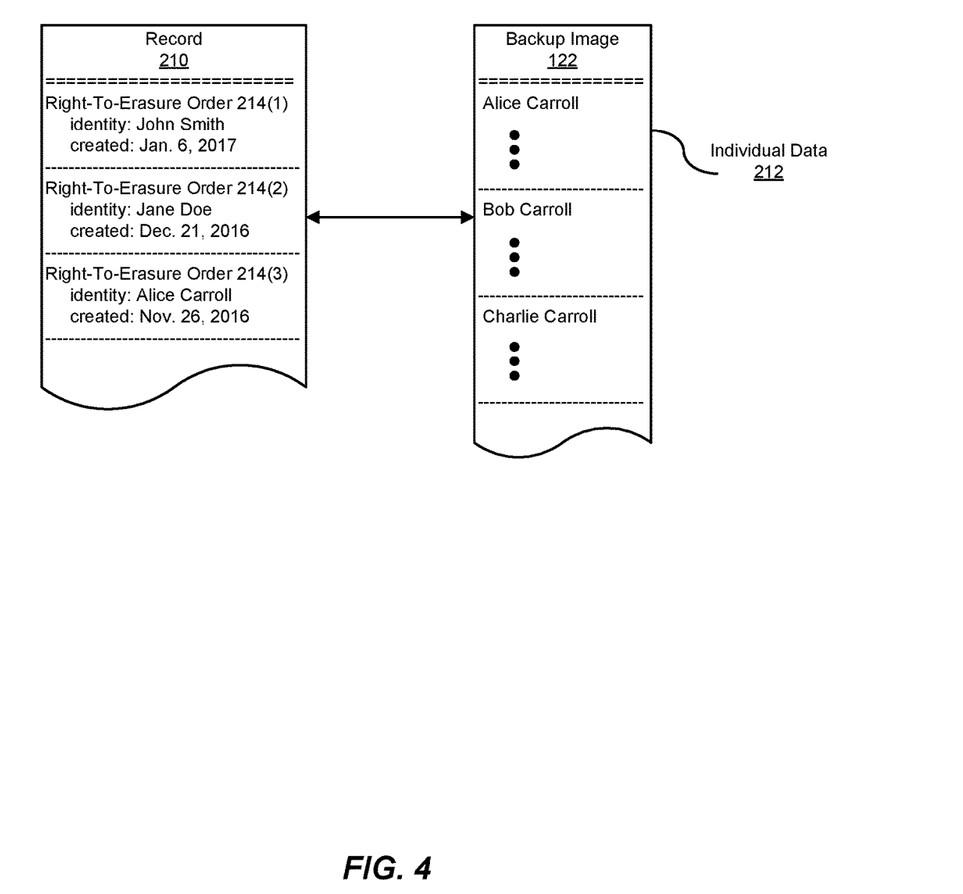
FIG. 4 is a block diagram of an example comparison of an example backup image and an example record of right-to-erasure orders.

As illustrated in FIG. 4, comparison module 106 may compare backup image 122 containing data on three individuals (e.g., "Alice Carroll," "Bob Carroll," and "Charlie Carroll") with record 210 of right-to-erasure orders 214(1), 214(2), and 214(3). In this example, comparison module 106 may compare the identity of each individual in right-to-erasure orders 214(1), 214(2), and 214(3) with identifying information found in backup image 122. Backup image 122 may also be selected for comparison due to a creation date before one or more of the creation dates of right-to-erasure orders 214(1) (e.g., "Jan. 6, 2017"), 214(2) (e.g., "Dec. 21, 2016"), and 214(3) (e.g., "Nov. 26, 2016").

Returning to FIG. 3, at step 306, one or more of the systems described herein may determine, by the computing device and based on the comparison, that the backup image includes individual data related to at least one right-to-erasure order. For example, determination module 108 may, as part of computing device 202 in FIG. 2, determine, based on the comparison, that backup image 122 includes individual data 212 related to right-to-erasure order 214.

Determination module 108 may determine that backup image 122 includes individual data 212 in a variety of ways. In one example, determination module 108 may determine that backup image 122 includes individual data 212 by identifying one or more individuals for which backup image 122 contains information and determining that the individual is associated with right-to-erasure order 214 in record 210. For example, determination module 108 may determine that data for multiple individuals from multiple right-to-erasure orders is included in backup image 122. In another example, determination module 108 may identify individual data 212 based on metadata of backup image 122 and/or the list of backup images associated with right-to-erasure order 214.

In the example of FIG. 4, determination module 108 may determine that backup image 122 includes individual data 212 (e.g., data for "Alice Carroll") related to right-to-erasure order 214(3). In this example, determination module 108 may further identify a specific subset of data in backup image 122 that includes individual data 212, thereby excluding unrelated data in backup image 122. In alternate examples, determination module 108 may simply determine that backup image 122 includes individual data 212 without identifying a specific subset of data.

Returning to FIG. 3, at step 308, one or more of the systems described herein may erase, by the computing device, the individual data to comply with the right-to-erasure order. For example, erasure module 110 may, as part of computing device 202 in FIG. 2, erase individual data 212 to comply with right-to-erasure order 214.

Erasure module 110 may erase individual data 212 in a variety of ways. In some embodiments, erasure module 110 may erase individual data 212 by identifying individual data 212 based on metadata of backup image 122. In these embodiments, the metadata of backup image 122 may include information on the location of individual data 212 within backup image 122, and backup image 122 may allow deletion of a subset of data. For example, a database table with individual records may contain a row of information for an individual, which includes individual data 212, and erasure module 110 may sanitize backup image 122 by deleting the row that includes individual data 212 from the table. Erasure module 110 may also repeat and/or re-execute right-to-erasure order 214 in a similar manner to its original execution to erase individual data 212.

In other embodiments, erasure module 110 may notify an administrator of right-to-erasure order 214, isolate backup image 122 in a quarantine environment, and delete individual data 212 from backup image 122. In these embodiments, the administrator may include a user with special privilege to access right-to-erasure data. For example, the administrator may have a higher user privilege to review right-to-erasure data. As another example, the administrator may have physical access to a secure location of a server containing backup images that may include right-to-erasure data. Backup image 122 may also be stored separately from record 210, audit log 124, and/or other elements of database 120. Furthermore, in these embodiments, the quarantine environment may include a secure storage system, a secure location, a partition, cloud storage, or any other form of separate storage that may only be accessed with special privilege.

Figure 5:
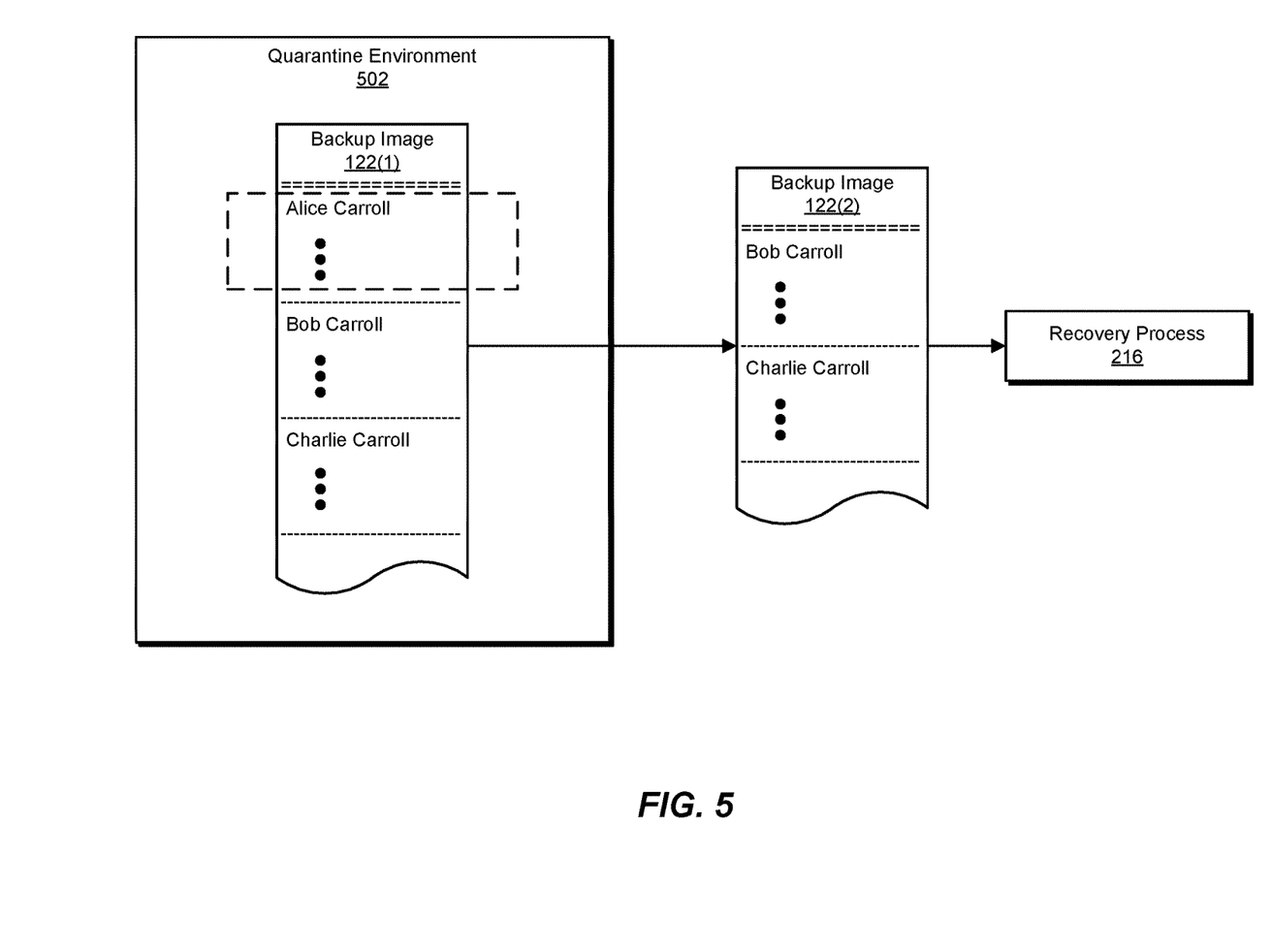
FIG. 5 is a block diagram of an example data erasure using an example quarantine environment.

As illustrated in FIG. 5, a backup image 122(1), which includes individual data 212 (e.g., "Alice Carroll"), may be isolated in a quarantine environment 502 after determination module 108 determines that backup image 122(1) includes individual data 212. In this example, metadata for backup image 122(1) may be incomplete or nonexistent such that the exact location of individual data 212 within backup image 122(1) is unknown. An administrator may then access quarantine environment 502 to review and/or delete individual data 212 to create a backup image 122(2) without individual data 212.

In further embodiments, erasure module 110 may delete backup image 122. In these embodiments, erasure of individual data 212 from backup image 122 may be difficult or impossible. Thus, to comply with right-to-erasure order 214, erasure module 110 may erase the entirety of backup image 122.

Furthermore, in the above embodiments, metadata of backup image 122 may not allow exact identification of individual data 212 within backup image 122. For example, metadata of backup image 122 may describe the contents of backup image 122, which may include information on various individuals, but not the exact location or other information of individual data 212. Thus, erasure module 110 may require deletion of backup image 122 and/or a review of backup image 122 or a backup file by the administrator to comply with right-to-erasure order 214.

Returning to FIG. 3, at step 310, one or more of the systems described herein may record, by the computing device, the erasure of the individual data in an audit log. For example, recording module 112 may, as part of computing device 202 in FIG. 2, record the erasure of individual data 212 in audit log 124.

Recording module 112 may record the erasure of individual data 212 in a variety of ways. In some examples, audit log 124 may include a list of actions showing deletion of individual data 212 and/or deletion of backup image 122. In these examples, audit log 124 may include information on backup images impacted by right-to-erasure order 214 and the prevention of recovering the impacted data. Furthermore, audit log 124 may include general information on the process of deleting any individual data related to right-to-erasure orders before completing recovery of data, rather than specific details on the deletion of individual data 212 in compliance with right-to-erasure order 214.

Returning to FIG. 3, at step 312, one or more of the systems described herein may complete, by the computing device, a recovery process for the requested data. For example, completion module 114 may, as part of computing device 202 in FIG. 2, complete recovery process 216 for the requested data.

Completion module 114 may complete recovery process 216 in a variety of ways. In some embodiments, completion module 114 may complete recovery process 216 by reintroducing backup image 122 to an unquarantined environment and/or completing recovery process 216 using backup image 122 after erasing individual data 212. For example, after the erasure of individual data 212 from backup image 122 using metadata, completion module 114 may simply allow request 208 for data recovery to complete with modified backup image 122.

In the example of FIG. 5, completion module 114 may reintroduce backup image 122(2), after erasure of individual data 212 from backup image 122(1), into an unquarantined environment outside of quarantine environment 502. Completion module 114 may then complete recovery process 216 using backup image 122(2).

In other embodiments, completion module 114 may complete recovery process 216 using a different backup image that does not include individual data 212. For example, in cases where a subset of data cannot be deleted from backup image 122, completion module 114 may select a similar backup image that does not violate right-to-erasure orders, or a backup image for which individual data 212 may be deleted, to complete recovery process 216.

In alternate embodiments, completion module 114 may alert a user about a lack of backup images that comply with right-to-erasure order 214. In these embodiments, completion of recovery process 216 may include an error or failure of data recovery. For example, completion module 114 may send the alert to a data backup software application, which may fail an attempt to recover the data in request 208 and alert a user of computing device 202 about the failure.

In one example, the systems described herein may further include automatically sending notification 218 of the completion of recovery process 216 in compliance with right-to-erasure order 214. In this example, right-to-erasure order 214 may require that a legal authority or an individual impacted by right-to-erasure order 214 be notified of actions related to right-to-erasure order 214. Computing device 202 may then send notification 218 to such authorities or individuals. Notification 218 may further include audit log 124 and/or other information describing the erasure of individual data 212 in compliance with right-to-erasure order 214.

As explained above in connection with method 300 in FIG. 3, the disclosed systems and methods may, by referencing a record of right-to-erasure orders during data recovery, better prevent associated data from being recovered in violation of the right-to-erasure orders. Specifically, the disclosed systems and methods may compare backup images used in a possible data recovery process with the record of right-to-erasure orders. By tracking data associated with right-to-erasure orders, the systems and methods described herein may determine whether backup images potentially include data relevant to right-to-erasure orders.

By isolating and deleting individual data linked to right-to-erasure orders, the disclosed systems and methods may then ensure backup images used in recovery do not violate the right-to-erasure orders. In some examples, when metadata about backup images is incomplete, the systems and methods described herein may also quarantine backup images for review by an administrator with access to review potential violations of right-to-erasure orders. Additionally, the systems and methods described herein may track erasure of relevant data to provide a comprehensive audit report for accountability purposes.

As detailed above, by intercepting data recovery requests in order to ensure right-to-erasure compliance, the disclosed systems and methods may improve methods to catch and prevent right-to-erasure data from being reintroduced into a system. Furthermore, by performing data erasure as a part of data recovery rather than data backup, the disclosed systems and methods may more easily prevent inconsistencies in data erasure due to backup copies created before executing right-to-erasure orders. Thus, the systems and methods described herein may better comply with right-to-erasure orders.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including"

and "having" (and their derivatives), as used in the specification and claims, are interchangeable with and have the same meaning as the word "comprising."

What is claimed is:

1. A computer-implemented method for ensuring right-to-erasure compliance during data recovery, at least a portion of the method being performed by a computing device comprising at least one processor, the method comprising:
   intercepting, by the at least one processor of the computing device, a request to perform a recovery process to restore backup data to a memory, wherein the recovery process comprises a sequence of computing actions to restore data to the memory from a backup image stored in a database;
   automatically comparing, by the at least one processor of the computing device, the backup image of the backup data with a record of right-to-erasure orders in response to intercepting the request;
   determining, by the at least one processor of the computing device and based on the comparison, that the backup image includes individual data related to at least one right-to-erasure order;
   erasing, by the at least one processor of the computing device, the individual data to ensure the recovery process complies with the at least one right-to-erasure order;
   recording, by the at least one processor of the computing device, the erasure of the individual data in an audit log; and
   completing, by the at least one processor of the computing device, the recovery process to restore the backup data without the individual data to the memory to ensure the recovery process does not violate the at least one right-to-erasure order.

2. The method of claim 1, wherein the record of right-to-erasure orders comprises at least one of:
   an identity of an individual;
   a creation date of the at least one right-to-erasure order;
   an execution date of data erasure for the at least one right-to-erasure order; and
   a list of backup images associated with the at least one right-to-erasure order.

3. The method of claim 1, wherein determining that the backup image includes individual data related to the at least one right-to-erasure order comprises:
   identifying at least one individual for which the backup image contains information; and
   determining that the at least one individual is associated with the at least one right-to-erasure order in the record of right-to-erasure orders.

4. The method of claim 1, wherein erasing the individual data to ensure the recovery process complies with the at least one right-to-erasure order comprises at least one of:
   identifying the individual data based on metadata of the backup image;
   notifying an administrator of the at least one right-to-erasure order;
   isolating the backup image in a quarantine environment;
   deleting the individual data from the backup image; and
   deleting the backup image.

5. The method of claim 4, wherein the administrator comprises a user with special privilege to access right-to-erasure data.

6. The method of claim 1, wherein the audit log comprises a list of actions showing at least one of:
   deletion of the individual data; and
   deletion of the backup image.

7. The method of claim 1, wherein completing the recovery process to restore the backup data comprises at least one of:
   reintroducing the backup image to an unquarantined environment;
   completing the recovery process using the backup image after erasing the individual data;
   completing the recovery process using a different backup image that does not include the individual data; and
   alerting a user about a lack of backup images that comply with the at least one right-to-erasure order.

8. The method of claim 1, further comprising automatically sending a notification of the completion of the recovery process, such that the notification complies with the at least one right-to-erasure order.

9. A system for ensuring right-to-erasure compliance during data recovery, the system comprising:
   at least one memory device that stores one or more computer-readable instructions; and
   a computing device comprising at least one hardware processor that executes the one or more computer-readable instructions to:
      intercept a request to perform a recovery process to restore backup data to a memory, wherein the recovery process comprises a sequence of computing actions to restore data to the memory from a backup image stored in a database;
      automatically compare the backup image of the backup data with a record of right-to-erasure orders in response to intercepting the request;
      determine, based on the comparison, that the backup image includes individual data related to at least one right-to-erasure order;
      erase the individual data to ensure the recovery process complies with the at least one right-to-erasure order;
      record the erasure of the individual data in an audit log; and
      complete the recovery process to restore the backup data without the individual data to the memory to ensure the recovery process does not violate the at least one right-to-erasure order.

10. The system of claim 9, wherein the record of right-to-erasure orders comprises at least one of:
    an identity of an individual;
    a creation date of the at least one right-to-erasure order;
    an execution date of data erasure for the at least one right-to-erasure order; and
    a list of backup images associated with the at least one right-to-erasure order.

11. The system of claim 9, wherein the at least one hardware processor executes the one or more computer-readable instructions to determine that the backup image includes individual data related to the at least one right-to-erasure order by:
    identifying at least one individual for which the backup image contains information; and
    determining that the individual is associated with the at least one right-to-erasure order in the record of right-to-erasure orders.

12. The system of claim 9, wherein the at least one hardware processor executing the one or more computer-readable instructions to erase the individual data to ensure the recovery process complies with the at least one right-to-erasure order comprises at least one of:
    identifying the individual data based on metadata of the backup image;

notifying an administrator of the at least one right-to-erasure order;
isolating the backup image in a quarantine environment;
deleting the individual data from the backup image; and
deleting the backup image.

13. The system of claim 12, wherein the administrator comprises a user with special privilege to access right-to-erasure data.

14. The system of claim 9, wherein the audit log comprises a list of actions showing at least one of:
deletion of the individual data; and
deletion of the backup image.

15. The system of claim 9, wherein the at least one hardware processor executing the one or more computer-readable instructions to complete the recovery process to restore the backup data comprises least one of:
reintroducing the backup image to an unquarantined environment;
completing the recovery process using the backup image after erasing the individual data;
completing the recovery process using a different backup image that does not include the individual data; and
alerting a user about a lack of backup images that comply with the at least one right-to-erasure order.

16. The system of claim 9, wherein the at least one hardware processor further executes the one or more computer-readable instructions to automatically send a notification of the completion of the recovery process, such that the notification complies with the at least one right-to-erasure order.

17. A non-transitory computer-readable medium comprising one or more computer-executable instructions that, when executed by at least one processor of a computing device, cause the computing device to:
intercept a request to perform a recovery process to restore backup data to a memory, wherein the recovery process comprises a sequence of computing actions to restore data to the memory from a backup image stored in a database;
automatically compare the backup image of the backup data with a record of right-to-erasure orders in response to intercepting the request;
determine, based on the comparison, that the backup image includes individual data related to at least one right-to-erasure order;
erase the individual data to ensure the recovery process complies with the at least one right-to-erasure order;
record the erasure of the individual data in an audit log; and
complete the recovery process to restore the backup data without the individual data to the memory to ensure the recovery process does not violate the at least one right-to-erasure order.

18. The non-transitory computer-readable medium of claim 17, wherein the record of right-to-erasure orders comprises at least one of:
an identity of an individual;
a creation date of the at least one right-to-erasure order;
an execution date of data erasure for the at least one right-to-erasure order; and
a list of backup images associated with the at least one right-to-erasure order.

19. The non-transitory computer-readable medium of claim 17, wherein the computer-executable instructions cause the computing device to determine that the backup image includes individual data related to the at least one right-to-erasure order by:
identifying at least one individual for which the backup image contains information; and
determining that the individual is associated with the at least one right-to-erasure order in the record of right-to-erasure orders.

20. The non-transitory computer-readable medium of claim 17, wherein the computer-executable instructions which cause the computing device to erase the individual data to ensure the recovery process complies with the at least one right-to-erasure order comprise instructions for at least one of:
identifying the individual data based on metadata of the backup image;
notifying an administrator of the at least one right-to-erasure order;
isolating the backup image in a quarantine environment;
deleting the individual data from the backup image; and
deleting the backup image.

* * * * *

UNITED STATES PATENT AND TRADEMARK OFFICE
CERTIFICATE OF CORRECTION

PATENT NO.        : 10,489,066 B1
APPLICATION NO.   : 15/441216
DATED             : November 26, 2019
INVENTOR(S)       : Thomas Krinke Page 1 of 1

It is certified that error appears in the above-identified patent and that said Letters Patent is hereby corrected as shown below:

In Column 15, Line 17 (approx.), Claim 15, after "comprises" insert -- at --.

Signed and Sealed this
Twenty-eighth Day of January, 2020

Andrei Iancu
*Director of the United States Patent and Trademark Office*